April 24, 1951 R. COZZOLINO ET AL 2,550,041
ELECTRIC TIRE INFLATION INDICATOR
Filed Aug. 25, 1947
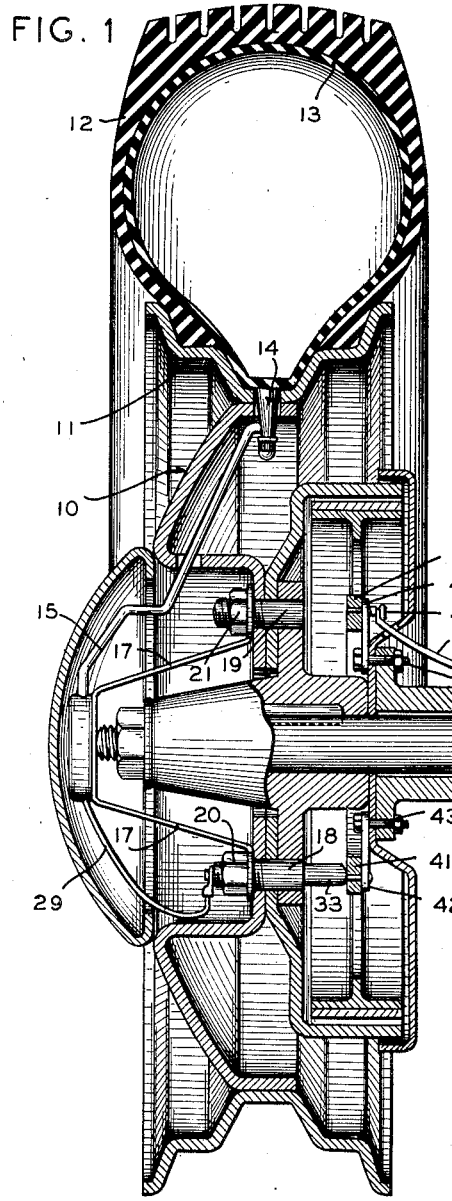
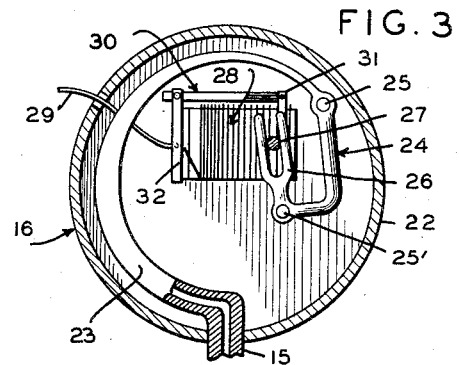
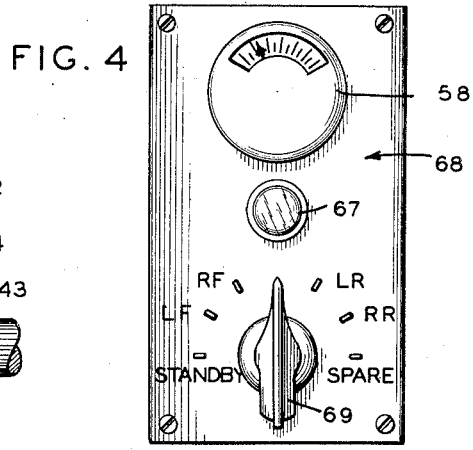
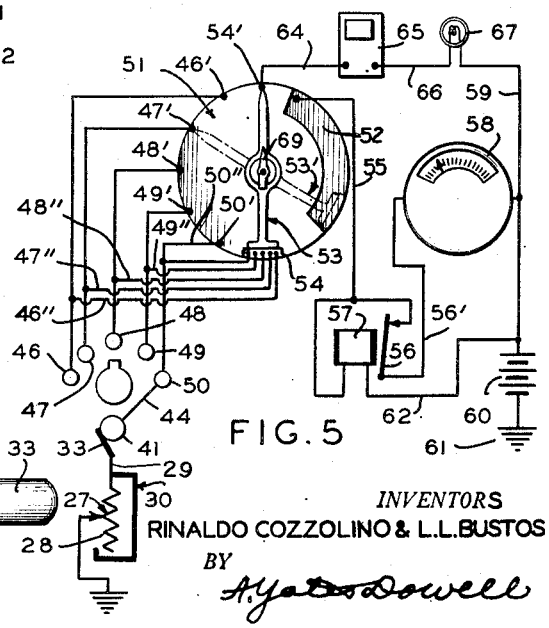
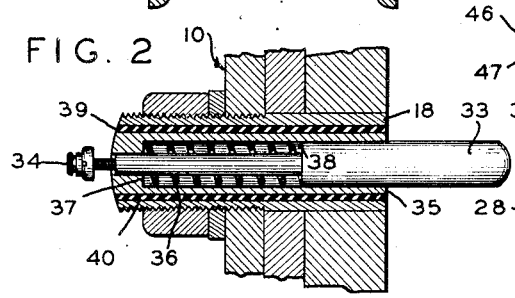
INVENTORS
RINALDO COZZOLINO & L.L. BUSTOS
BY A. Yates Dowell
ATTORNEY Patented Apr. 24, 1951

2,550,041

UNITED STATES PATENT OFFICE 2,550,041

ELECTRIC TIRE INFLATION INDICATOR

Rinaldo Cozzolino and Larry L. Bustos, Pueblo, Colo., assignors of twenty-two per cent to A. A. Fraterelli, ten per cent to S. Philip Cabibi, thirty-three per cent to Larry L. Bustos, and thirty-five per cent to Rinaldo Cozzolino, all of Pueblo, Colo.

Application August 25, 1947, Serial No. 770,406

3 Claims. (Cl. 177—311)

This invention relates to indicators and more particularly to a device for indicating the pressure of the air in the pneumatic tires of an automobile or other vehicle and to provide audible and visual means for indicating pressures existing in the tires which are of a lower or higher value than that desired therein.

It is an object of the invention to provide a tire inflation indicator whereby the air pressure existing in any of the tires of the vehicle may be accurately and instantly determined.

A further object of the invention is the provision of a tire inflation indicator whereby unsafe air pressures will be instantly brought to the attention of the operator of the vehicle by visual or audible means.

Another object of the invention is the provision of an electric tire inflation indicator which is simple and easy to construct and use and which is durable and long lasting.

Further objects and advantages of the invention will be apparent from the following specification taken in conjunction with the accompanying drawings, wherein:

Fig. 1 is an elevation partially in section through a vehicle wheel showing the wheel unit of the invention in place;

Fig. 2, a detail of the connector lug;

Fig. 3, a detail partially in section showing the construction of the air pressure responsive unit;

Fig. 4, a plan view of the control dial; and

Fig. 5, a circuit diagram of the invention.

With continued reference to the drawings, a vehicle wheel 10 is provided with a conventional rim 11 and tire 12 having a tube 13 and valve stem 14. The valve stem 14 is provided with a branch line 15 leading to a pressure responsive unit or gauge 16. Gauge 16 is supported by brackets or supports 17 attached to lugs 18 and 19 of the vehicle wheel by means of lug bolts 20 and 21. The gauge is comprised of a casing 22 which may be of either conducting or non-conducting material and has attached thereto by suitable means a pressure responsive tube 23 of the Bourdon type which is in communication with the aforementioned tire tube 13 by means of the connection 15 and valve stem 14.

A U-shaped arm indicated at 24 is pivotally attached to the extremity of the pressure tube 23 by a pin 25 and said arm is pivotally attached to the casing 22 of said gauge by a pin 25'. One side of the U-shaped arm 24 has a U-shaped portion 26 having associated therewith a movable contact 27.

Attached to said casing 22 but insulated therefrom by suitable means is a rheostat or coil 28 having a lead 29 and a conductor bar indicated at 30. The conductor bar 30 is attached to the lead 29 at a point 32. Although the coil 28 is shown as a variable resistance, the invention is not limited to this type of circuit characteristic determining means as any may be employed which will vary the circuit characteristics in accordance with the air pressure in the tires. Said conductor bar has an arm or projection 31, adjustably positioned on said bar, which may be set along said rheostat in a position corresponding to a predetermined pressure of the associated tire. The construction of the gauge provides that movements of the tube 23 in response to changes in pressure in the tire tube 13 will produce a movement of the pin 25 causing the arm 24 to pivot about the pin 25', moving the rheostat contact 27 across the surface of the rheostat.

Increasing pressures will cause the contact 27 to move across the rheostat toward the lead 29 but the device is designed so that a substantial resistance will remain in the circuit at the extent of movement in this direction; decreasing pressures will cause the contact 27 to move across the rheostat toward the conductor bar arm 31. The bar 31 is positioned relative to the rheostat in such a way that at a predetermined pressure a leg of the U shaped portion 26 will contact arm 31 thus providing a direct connection or shunt across the rheostat to the lead 29 thereby nullifying the effect of said rheostat.

The lead 29 from the gauge 22 is connected to a post 33 by a suitable fastener 34. The post 33 has a sleeve 35 surrounding it and a spring 36 within the sleeve abutting shoulders 37 on the sleeve and 38 on the post in such a way as to urge the shoulders apart. Insulation 39 surrounding the sleeve 35 is provided the entire length thereof. The lug 18 is provided with an aperture 40 therethrough for receiving the post 33, its sleeve 35 and insulation 39 as shown in Fig. 2.

A contact ring 41 of conducting material is supported by brackets 42 of non-conducting material attached to the axle support by fasteners 43, the post 33 therefor being maintained in constant resilient contact with the contact ring 41 by means of the lug assembly previously referred to.

A lead 44 secured to the contact ring 41 by a suitable fastener 45 extends to a lead contact 46 in a junction box or the like where lead contacts 47, 48, 49 and 50 are also gathered from the other tires, including a spare of the vehicle.

Conductors extend from each of the contacts 46, 47, 48, 49 and 50 respectively to contact points 46', 47', 48', 49' and 50' on a selector switch 51. A contact segment 52 of conducting material is provided on a portion of the switch opposite the contact points. A pivotally mounted conductor arm or pointer 53 is provided for connecting the contact points to the contact segment. Leads 46", 47", 48", 49" and 50" are provided from each of the contacts 46, 47, 48, 49 and 50 to a collector contact point 54 located on the switch. On Fig. 5 of the drawing a schematic diagram of the circuit from the contact 50 through the contact ring 41, the post 33, the lead 29, the resistance 28, the contact 27 and to the ground are shown. It is understood that a similar circuit extends to each of the other wheels.

A lead 55 extends from the segment 52 to a normally closed relay 57 having an armature 56. Lead 56' connects the relay armature 56 with a circuit characteristic indicating instrument or voltmeter 58 and lead 59 extends therefrom to a source of power or battery 60 which is suitably grounded to the chassis of the vehicle at 61. Lead 62 extends from relay 57 to battery 60. Relay 57 is designed to actuate its armature 56 at currents above a certain predetermined value. Voltmeter 58 is graduated to read in pounds per square inch of tire pressure or other suitable units.

The circuit described above provides means whereby the pressure within predetermined limits in any tire may be indicated on the instrument 58 by manually moving the conductor arm 53 to a position whereby it connects the contact point corresponding to the tire whose air pressure it is desired to ascertain to the contact segment 52, the current then passing through the instrument 58 being proportional to the resistance in the rheostat 28, and the circuit from the lead 29 to the rheostat point 27 being completed to the frame of the vehicle through the arm 24, casing 22 and brake 17.

When the pressure in a tire reaches a predetermined low value resulting in the shunting out of the rheostat 28 so that the current flow might be great enough to endanger the instrument 58, the relay 57 is actuated to break the circuit to said instrument, resulting in a reading on said instrument of zero; thus a zero reading on the instrument indicates that the pressure in the corresponding tire is dangerously low.

Means are provided whereby a dangerously low or high air pressure existing in any of the tires will be automatically called to the attention of the operator, without the necessity of his contacting each of the individual contact points. When a signal is received the operator may then contact the individual points and determine which of the tires requires attention.

When the conductor arm 53 is in the position shown in Fig. 5, it will connect the collector contact point corresponding to leads from all of the tires to a contact 54' to which is connected a lead 64 and a bell or other audible indicator 65, lead 66, a light or other visual indicator 67, and lead 59 which is connected to the battery 60 and ground 61. The bell 65 is adapted to be actuated at values of voltage less than that at which the light 67 is adapted to be actuated. The bell 65 therefore will sound when the voltage applied thereto reaches a point corresponding to low resistance on a rheostat of a tire gauge, and light 67 will light only with the resistance of the rheostat is substantially zero and occurs when the arm associated therewith contacts the conductor arm 31. The construction of this circuit therefore provides that when the air pressure in a tire reaches a predetermined high value the bell 65 will be actuated alone, but if the pressure is zero or dangerously low, both the bell and the light will be actuated. Upon receiving either of these signals, the operator may proceed to determine which tire is unsafe as previously outlined.

It is contemplated that in normal use the conductor arm 53 will be left in the standby position whereby an unsafe pressure existing in any of the tires may be instantly recognized.

The control box for the device may be mounted on the dashboard of the vehicle or other suitable place and may take the form shown in Fig 4 wherein the indicating instrument 58, visual signal means 67 and switch handle 69 which is mounted axially with the conductor arm 53 may be mounted on a panel 68. The various positions of the contact points leading to the various tires may be indicated on the panel as shown although it is obvious that other means of positioning the controls may be employed.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A tire inflation indicator for a vehicle comprising in combination with a plurality of wheels each having a pneumatic tire, pressure responsive means communicating with each of said tires, means associated with each of said pressure responsive means for determining the electrical characteristics of a circuit in accordance with the pressure in each of said tires, each of said circuit characteristic determining means having a shunt adapted to be connected thereacross to eliminate said means from said circuit and means for connecting said shunt when the pressure in said tire is less than a predetermined value, an electrical connection from each of said circuit characteristic determining means to an individual contact point of a selector switch, an electrical connection from each of said circuit characteristic determining means to a common contact point on the selector switch, a contact segment on said selector switch, a movable arm associated with said selector switch for connecting any of said individual contact points to said contact segment, a lead extending from said contact segment to a normally closed relay, a first lead extending from said relay to a source of electrical energy, a second lead extending from said relay to a circuit characteristic indicating instrument and a lead from the instrument extending to said source of electrical energy, said source of electrical energy being grounded to the frame of said vehicle whereby said instrument may provide an indication of the pressure in any of said tires when said movable arm provides a connection between the contact segment and the contact point of the tire whose pressure it is desired to ascertain and whereby when the electrical energy passing through said relay exceeds a predetermined value said relay will open the circuit to said instrument; a contact point on said switch having a lead extending to an audible type signal adapted to be electrically energized, a lead extending to a visual type signal adapted to be electrically energized and a lead extending to said source of electrical energy, said audible type signal being adapted to be actuated by a lesser amount of electrical energy than is required to actuate said visual type signal, whereby said movable arm may connect said common contact point with the contact having a lead extending to said audible and said visual type signals in order to actuate said audible type signal when the pressure in any one or more of said tires exceeds a predetermined value and to actuate both of said signals when the pressure in any one or more of said tires is below a predetermined value.

2. A tire inflation indicator comprising in combination with a plurality of wheels, each having a pneumatic tire, pressure responsive means communicating with each of said tires, circuit characteristic determining means associated with each of said pressure responsive means and variable in response to changes in the pressure therein, means whereby the effect of said circuit characteristic determining means may be nullified when a predetermined pressure is reached, a selector switch, a first electrical connection from each of said circuit characteristic determining means to an individual contact point of said selector switch, a second electrical connection from each of said circuit characteristic determining means to a common contact point of said selector switch, a contact segment on said selector switch having a lead extending to a circuit characteristic indicating means, a contact on said switch having a lead extending to a signal adapted to be electrically energized, the leads from the contact and from the segment extending to a source of electrical energy, and a movable arm associated with said selector switch, whereby said movable arm may connect said common contact point with the contact having a lead extending to said signal to indicate when the pressure in one or more of said tires is greater or less than predetermined values, and whereby said movable arm may connect said contact segment with any one of said individual contact points in order to indicate the value of the circuit characteristic of the circuit characteristic determining means of the associated tire.

3. A tire inflation indicator comprising in combination with a plurality of wheels, each having a pneumatic tire, pressure responsive means communicating with each of said tires, circuit characteristic determining means associated with each of said pressure responsive means and variable in response to changes in the pressure therein, a selector switch, a first electrical connection from each of said circuit characteristic determining means to an individual contact point of said selector switch, a second electrical connection from each of said circuit characteristic determining means to a common contact point of said selector switch, a contact segment on said selector switch having a lead extending to a circuit characteristic indicating means, a contact on said switch having a lead extending to a signal adapted to be electrically energized, and a movable arm associated with said selector switch, whereby said movable arm may connect said common contact point with the contact having a lead extending to said signal to indicate when the pressure in one or more of said tires is greater or less than predetermined values, and whereby said movable arm may connect said contact segment with any one of said individual contact points in order to indicate the value of the circuit characteristic of the circuit characteristic determining means of the associated tire.

RINALDO COZZOLINO.
LARRY L. BUSTOS.

REFERENCES CITED

The following references are of record in the file of this patent:

UNITED STATES PATENTS

| Number | Name | Date |
| --- | --- | --- |
| 1,811,769 | Weaver | June 23, 1931 |
| 1,908,503 | Behrend | May 9, 1933 |
| 2,033,424 | Gieskieng | Mar. 10, 1936 |
| 2,135,303 | Greene | Nov. 1, 1938 |
| 2,167,568 | Harfst | July 25, 1939 |
| 2,248,047 | Addy et al. | July 8, 1941 |
| 2,325,179 | Doering | July 27, 1943 |
| 2,355,295 | Holinaty | Aug. 8, 1944 |